United States Patent
Koo (10) Patent No.: US 9,491,681 B2
(45) Date of Patent: Nov. 8, 2016

(54) APPARATUS AND METHOD FOR SUPPORTING DATA TRANSMISSION SERVICE OVER MULTIPLE NETWORKS

(71) Applicant: SK TELECOM CO., LTD., Seoul (KR)

(72) Inventor: Jahon Koo, Seoul (KR)

(73) Assignee: SK TELECOM CO., LTD., Seoul (KR)

(*) Notice: Subject to any disclaimer, the term of this patent is extended or adjusted under 35 U.S.C. 154(b) by 60 days.

(21) Appl. No.: 14/287,745

(22) Filed: May 27, 2014

(65) Prior Publication Data

US 2014/0269512 A1    Sep. 18, 2014

Related U.S. Application Data

(63) Continuation of application No. PCT/KR2012/008660, filed on Oct. 22, 2012.

(30) Foreign Application Priority Data

Nov. 28, 2011  (KR) .................. 10-2011-0125306

(51) Int. Cl.
   *H04W 36/36*  (2009.01)
   *H04W 76/02*  (2009.01)
   *H04W 48/18*  (2009.01)

(52) U.S. Cl.
   CPC .......... *H04W 36/36* (2013.01); *H04W 76/026* (2013.01); *H04W 48/18* (2013.01)

(58) Field of Classification Search
   None
   See application file for complete search history.

(56) References Cited

U.S. PATENT DOCUMENTS

| | | | |
|---|---|---|---|
| 2006/0291455 A1* | 12/2006 | Katz | H04L 29/06 370/355 |
| 2012/0149310 A1* | 6/2012 | Tofighbakhsh | H04W 48/18 455/67.11 |
| 2012/0188949 A1* | 7/2012 | Salkintzis | H04L 45/308 370/329 |

FOREIGN PATENT DOCUMENTS

| | | |
|---|---|---|
| CN | 101715209 A | 5/2010 |
| CN | 101904191 A | 12/2010 |
| KR | 100612685 B1 | 8/2006 |
| KR | 1020070074346 A | 7/2007 |
| KR | 100777367 B1 | 11/2007 |
| KR | 100785394 B1 | 12/2007 |
| KR | 1020110071427 A | 6/2011 |

OTHER PUBLICATIONS

International Search Report mailed Feb. 25, 2013 for PCT/KR2012/008660.
Korean Notice of Allowance for application No. 10-2011-0125306 dated Sep. 3, 2013.
Chinese Office Action mailed Mar. 28, 2016 for corresponding Chinese Patent Application No. 201280056120.2.

* cited by examiner

*Primary Examiner* — Christine Duong
(74) *Attorney, Agent, or Firm* — Hauptman Ham, LLP (57) ABSTRACT

A transmitting device includes a communication unit to transmit data through two or more networks including a first network and a second network, and a transmission controller to control the communication unit to transmit data to a receiving device through the first network, and transmit the data, which is to be transmitted to the receiving device through the first network, to the receiving device through the second network in response to a message from the receiving device indicating a data roundabout transmission request state of the receiving device with respect to the first network.

18 Claims, 5 Drawing Sheets

APPARATUS AND METHOD FOR SUPPORTING DATA TRANSMISSION SERVICE OVER MULTIPLE NETWORKS

CROSS-REFERENCE TO RELATED APPLICATION

The instant application is a continuation of PCT/KR2012/008660, filed on Oct. 22, 2012, which is based on and claims priority to Korean Patent Applications No. 10-2011-0125306, filed on Nov. 28, 2011. The disclosures of above-listed applications are hereby incorporated by reference herein in their entirety.

TECHNICAL FIELD

The present disclosure relates to an apparatus and a method for supporting a data transmission service in a multi-network environment.

BACKGROUND ART

The statements in this section merely provide background information related to the present disclosure and do not constitute prior art.

Recently, communication services based on a plurality of mobile communication networks including Wideband Code Division Multiple Access (WCDMA), Code Division Multiple Access (CDMA), Wireless Broadband (WiBro), Long Term Evolution (LTE) and the like are provided. Also, a communication service based on a Wireless Local Area Network (WLAN) (WiFi) corresponding to a wireless short distance communication network is provided.

As described above, even in a multi-network environment where a plurality of networks coexist, it is known to select only one network from the plurality of networks to transmit data.

However, the inventor(s) has noted that such a known method has a limit on providing a seamless data service since a load factor of the selected one network rapidly increases when large capacity data is transmitted/received. Further, the inventor(s) has experienced that the method is not suitable for an environment where the use of various wireless devices such as a smart phone, a tablet Personal Computer (PC) and the like increases and various large capacity data services for the wireless devices also increase.

Accordingly, the inventor(s) has experienced that a new service method of actively selecting an access network of a terminal device according to a network status in the multi-network environment where a plurality of networks coexist and efficiently transmitting data by using the selected network is required.

Meanwhile, when data is transmitted to the terminal device through a network (for example, WiFi) which does not provide a handover function, the inventor(s) has experienced that provision of a seamless data transmission service is needed even when the data transmission is difficult according to a network status.

SUMMARY

In accordance with some embodiments of the present disclosure, a transmitting device includes: a communication unit and a transmission controller. The communication unit is configured to transmit data through two or more networks including a first network and a second network. And the transmission controller is configured to control the communication unit to transmit data to a receiving device through the first network, and transmit the data, which is to be transmitted to the receiving device through the first network, to the receiving device through the second network in response to a message from the receiving device indicating a data roundabout transmission request state of the receiving device with respect to the first network.

In accordance with some embodiments of the present disclosure, a receiving device includes a communication unit and a controller. The communication unit is configured to receive data through two or more networks including a first network and a second network. And the controller is configured to control the communication unit to receive data from a transmitting device through the first network, determine whether the receiving device is in a data roundabout transmission request state for receiving the data, which is to be received through the first network, through the second network, and control the communication unit to transmit a message informing the transmitting device of the data roundabout transmission request state when the receiving device is determined as being in the data roundabout transmission request state.

In accordance with some embodiments of the present disclosure, a transmitting device is configured to: transmit data to a receiving device through a first network among two or more networks; receive a message from the receiving device; identify whether the message indicates a data roundabout transmission request state of the receiving device with respect to the first network; and transmit the data, which is to be transmitted to the receiving device through the first network, to the receiving device through a second network among the two or more networks, when the receiving device is determined as being in the data roundabout transmission request state as a result of the identification.

In accordance with some embodiments of the present disclosure, a receiving device is configured to: receive data from a transmitting device through a first network among two or more networks; determine whether the receiving device is in a data roundabout transmission request state for receiving the data, which is to be received through the first network, through a second network among two or more networks; and inform the transmitting device of the data of the data roundabout transmission request state when the receiving device is determined as being in the data roundabout transmission request state as a result of the determination.

DETAILED DESCRIPTION

The present disclosure is to provide a seamless data transmission service in transmitting data to a terminal device through a network which does not provide a handover function in a multi-network environment. Some embodiments of the present disclosure will be hereinafter described with reference to the accompanying drawings.

Figure 1:
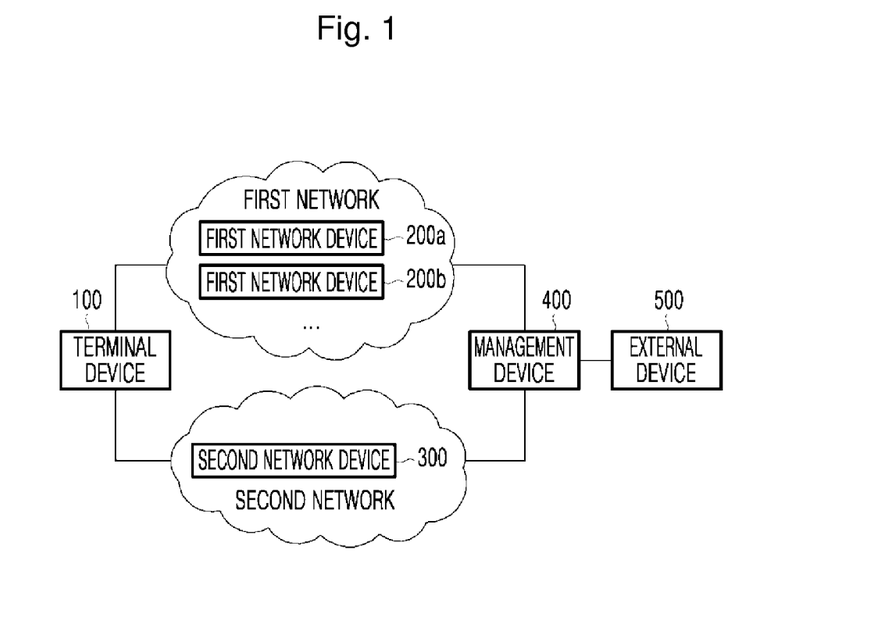
FIG. 1 is a schematic view of a configuration of a data transmission service system over multiple networks including devices according to at least one embodiment of the present disclosure.

FIG. 1 is a schematic view of a data transmission service system over multiple networks including a data transmission device over multiple networks and a data transmission/reception device over multiple networks according to at least one embodiment of the present disclosure.

As illustrated in FIG. 1, a simultaneous data transmission service system over multiple networks according to at least one embodiment of the present disclosure includes a terminal device 100, an external device 500 for providing data services such as an Internet service, a video providing service, a mobile Voice over Internet Protocol (mVoIP) service and the like, a first network device 200 for supporting a first network and a second network device 300 for supporting a second network, the first network device 200 and the second network device 300 connecting the terminal device 100 and the external device 500, and a management device 400 located between the terminal device 100 and the external device 500 to support a simultaneous transmission service for providing the data services provided from the external device 500 by using both the first network device 200 and the second network device 300. Other components of the simultaneous data service system, such as the terminal equipment 100, the first network device 200, the second network device 300 and the management device 400 are implemented by one or more processors and/or application-specific integrated circuits (ASICs).

The terminal device 100 refers to a user device for using the data service provided from the external device 500 and corresponds to, for example, a mobile terminal, a Personal Computer (PC), a notebook computer, a tablet PC, a Personal Digital Assistant (PDA) or the like. However, the terminal device 100 is not limited thereto and includes all devices which transmit/receive data through both the first network and the second network.

The multiple networks are a variety of networks including, for example, WCDMA, CDMA, WiBro, WLAN (WiFi), Long Term Evolution (LTE) and the like, in the at least one embodiment, they are limited thereto and includes all networks (e.g., networks including one or more homo/hetero communication networks) for providing wireless communication. Further, each of the first network and the second network is a network, for example, WCDMA, CDMA, WiBro, WLAN (WiFi), LTE or the like, but is not limited thereto and includes all networks (e.g., networks including one or more homo/hetero communication networks) for providing wireless communication.

In connection with this, when the first network is a 3G network, the first network device 200 is, for example, a Gateway GPRS Support Node (GGSN) of the 3G network. Further, when the second network is WiFi corresponding to one of short distance networks, the second network device 300 corresponds to, for example, an Access Point (AP) of WiFi. That is, the first network and second network are hetero communication networks in a manner that data to be transmitted to the receiving apparatus through the first network are, alternatively or concurrently, transmitted through the second network when the first network is not available or in a proper state to transmit the data. Depending on network environments for the first network and the second network of the multiple networks, the second network is selected (changed), for example by a controller of the terminal device 100 or a transmission controller of the management device 400, to transmit the data which has been currently transmitted to the receiving apparatus through the first network.

Further, the management device 400 refers to a server device for supporting a simultaneous transmission service to the terminal device 100 and is located at the first network, the second network, or a network separated from the first network and the second network to support the simultaneous transmission service.

With respect to data transmission/reception between the terminal device 100 and the external device 500, the data transmission service over the multiple networks realizes a service of dividing one data between the terminal device 100 and the management device 400, transmitting the divided partial data by using a plurality of multiple networks (for example, WiFi and 3G), and combining the received partial data, so as to reconstruct the original data. Of course, the data transmission/reception between the terminal device 100 and the management device 400 is made using one network having an optimal real time network status.

At this time, in a case of an uplink in which the terminal device 100 transmits data to the management device 400, the terminal device 100 is a transmitting device and the management device 400 is a receiving device. Reversely, in a case of a downlink in which the management device 400 transmits data to the terminal device 100, the terminal device 100 is the receiving device and the management device 400 is the transmitting device.

Hereinafter although a downlink process will be described for the convenience of description, the present disclosure is equally applied to an uplink process, and accordingly, a function of the terminal device 100 in the downlink is performed by the management device 400 in the uplink and a function of the management device 400 in the downlink is performed by the terminal device 400 in the uplink.

It is assumed for convenience of explanation that the terminal device 100 and the management device 400 access a first network device 200a to be connected with each other through the first network, that is, WiFi network.

When the management device 400 receives data to be transmitted to the terminal device 100 from the external device 500, the management device 400 divides the data into partial data, identifies data transmission rates of respective networks (for example, WiFi and 3G), that is, a first transmission rate of data transmission to the first network device 200a and a second transmission rate of data transmission to the second network device 300, selects first partial data to be transmitted to the first network device 200a from the partial data divided from the data to be transmitted based on the identified transmission rates, and selects second partial data to be transmitted to the second network device 300 from the remaining partial data.

Of course, when the transmission rate of the first network is set as 100% and the transmission rate of the second network is set as 0% in the data transmission rates of the respective networks, the management device 400 selects all the data to be transmitted as the first partial data to be transmitted to the first network device 200a. Accordingly, the data to be transmitted are transmitted through the first network without any division into partial data.

Further, the management device 400 transmits each of the partial data selected for each of the networks (for example, WiFi and 3G) through each of the networks (for example, WiFi and 3G), the first network device 200a transmits the first partial data transmitted from the management device 400 to the terminal device 100, and the second network device 300 transmits the second partial data transmitted from the management device 400 to the terminal device 100.

Then, the terminal device 100 corresponding to a receiving side device receives the partial data through two or more networks, rearrange the received partial data according to a division order based on order information of the partial data, and combine the rearranged partial data, so as to reconstruct the data to be transmitted.

However, although wireless packet service networks, such as a 3G network, an LTE network and the like, provide a handover function, a WiFi network does not provide the handover function.

Accordingly, the present disclosure provides a method of guaranteeing seamless continuity through an effect, such as the handover function, in transmitting data to a receiving side device through a network (for example, WiFi) which does not provide the handover function in the multi-network environment.

For the convenience of description, the following description will be made based on the downlink in which the management device 400 is the transmitting device and the terminal device 100 is the receiving device. However, the present disclosure is equally applied to the uplink process, and accordingly, a function of the terminal device 100 in the downlink is performed by the management device 400 in the uplink and a function of the management device 400 in the downlink is performed by the terminal device 400 in the uplink.

First, the management device 400 and the terminal device 100 are connected to each other through a network selected for data transmission/reception from two or more networks, that is, the first network according to the data transmission service over the multiple networks. Further, the management device 400 and the terminal device 100 are connected to each other through the second network.

The management device 400 corresponding to the transmitting side device transmits data to the terminal device 100 corresponding to the receiving device through the first network (for example, WiFi).

At this time, the data transmitted to the terminal device 100 through the first network are the data to be transmitted or the first partial data of the partial data divided from the data to be transmitted.

The terminal device 100 receives the data transmitted from the management device 400 through the first network.

The terminal device 100 determines whether the terminal device 100 is in a particular data roundabout transmission request state for receiving the data, which has been transmitted through the first network, through a particular second network.

At this time, the data roundabout transmission request state includes at least one of a network device connection movement prediction state where a connection between several network devices corresponding to the first network is moved, a connection error generation state where a connection error of the first network is generated, and a particular data service type use state where the data received through the first network corresponds to a particular data service type.

The terminal device 100 determines that the terminal device 100 is in the data roundabout transmission request state when a state of a movement of a connection between a connected network device and an adjacent network device is detected based on at least one of signal intensity of the access network device corresponding to the first network, and wireless quality information measured for the connected network device and an available bandwidth.

For example, the terminal device 100 determines whether the terminal device 100 is in the particular data roundabout transmission request state based on signal intensity of the connected network device corresponding to the first network by determining whether the network device connection movement prediction state, which satisfies at least one of a first condition in which the signal intensity of the first network device 200a is smaller than or equal to a particular first signal intensity and a second condition in the which signal intensity of the first network device 200b is equal to or larger than a particular second signal intensity, is detected. In other words, it is determined whether a case where the connection of the terminal device 100 is to be moved to another adjacent network device from the connected network device as the terminal device 100 moves corresponds to the data roundabout transmission request state.

This results from a fact that as the terminal device 100 moves in a first network area, that is, a WiFi area, the terminal device 100 becomes farther from the connected first network device 200a and thus the signal intensity of the first network device 200a becomes weaker, and as the terminal device 100 becomes closer to the adjacent first network device 200b, the signal intensity of the adjacent first network device 200b becomes stronger. Accordingly, the first signal intensity and the second signal intensity are defined as signal intensities based on the prediction of the connection movement between the devices.

Further, the terminal device 100 determines whether the data is in the particular data roundabout transmission request state based on the wireless quality information measured for the connected network device corresponding to the first network, that is, by determining whether the network device connection movement prediction state in which wireless quality information measured for the first network device 200a, for example, a Carrier to Interference and Noise Ratio (CINR) is beyond a particular normal range value is detected. In other words, it is determined whether a case where the connection of the terminal device 100 is to be moved to another adjacent network device from the connected network device since quality of the first network which the terminal device 100 receives through the connected first network device 200a deteriorates due to surrounding interference corresponds to the data roundabout transmission request state.

Further, the terminal device 100 determines whether the terminal device 100 is in the particular data roundabout transmission request state based on the available bandwidth measured for the connected network device corresponding to the first network, that is, by determining whether the network device connection movement prediction state, in which an available bandwidth measured/identified for the first network device 200a is beyond a particular normal range value, is detected. In other words, it is determined whether a case, where the connection of the terminal device 100 is to be moved to another adjacent network device from the connected network device due to a flood of users in the connected first network device 200a or the like, corresponds to the data roundabout transmission request state.

Alternatively, the terminal device 100 determines whether the terminal device 100 is in the particular data roundabout transmission request state by determining whether the connection error generation state, in which the connection error of the first network is generated due to various unpredictable factors including the movement of the terminal device 100, is detected.

That is, the terminal device 100 employs various methods of determining the connection error generation state by detecting that the signal intensity of the connected first network device 200a becomes weaker than or equal to a first signal intensity, a delay value of a data packet received through the first network goes beyond a normal acceptance range, a number of losses of the received data packets is equal to or larger than a normal acceptance number or the like.

Alternatively, the terminal device 100 determines whether the terminal device 100 is in the particular data roundabout transmission request state by presetting a particular data service type and determining whether data received through the first network corresponds to the preset particular data service type and whether the data service is in a particular data service type use state in which the second network has higher connection continuity than that of the first network.

In other words, the terminal device 100 determines whether the terminal device 100 is in the particular data roundabout transmission request state by determining whether the data received through the first network corresponds to the preset particular data service type and whether the second network has the higher connection continuity than that of the first network. The connection continuity means that data transmission/reception is made through a corresponding network without any disconnection, and networks such as 3G, LTE and the like have higher connection continuity in comparison with the WiFi network.

That is, the terminal device 100 presets a particular data service type requiring the reliability guarantee. For example, the particular data service type includes a data service type corresponding to large capacity traffic equal to or larger than a particular threshold, a data service type corresponding to real time streaming traffic, a data service type corresponding to bidirectional communication traffic, or a data service type guaranteeing a seamless data service. Alternatively, the particular data service type includes a type of transmitted/received data corresponding to traffic including a particular control signal or traffic for information collection of a particular management system, that is, traffic requiring security.

Accordingly, the terminal device 100 recognizes a type of an application internally executed in accordance with the data received through the first network to determine whether the data corresponds to the particular data service type according to the type of the application or analyzes the data traffic received through the first network to determine whether the data corresponds to the particular data service type.

Further, the terminal device 100 determines whether the second network has higher connection continuity than that of the first network through which the data is currently received. A reference of the determination is pre-stored in the terminal device 100.

As described above, the terminal device 100 informs the transmitting device which transmits the data, that is, the management device 400 of the particular data roundabout transmission request state when the terminal device 100 is in the particular data roundabout transmission request as a result of the determination on whether the terminal device 100 is in the particular data roundabout transmission request state for receiving the data, which has been received through the first network, through the particular second network.

Further, when a selection of the data roundabout transmission request state is input by the user, the terminal device 100 determines that the terminal device 100 is in the particular data roundabout transmission request state and inform the management device 400 of the particular data roundabout transmission request state.

When the state of the receiving device, that is, the terminal device 100 corresponds to the particular data roundabout transmission request state with respect to the first network, the management device 400 transmits data, which will be transmitted to the terminal device 100 corresponding to the first network, to the terminal device 100 through the particular second network after the generation of the data roundabout transmission request state.

For example, the management device 400 receives a message informing of the particular data roundabout transmission request state from the terminal device 100 as described above.

In this event, the management device 400 recognizes that the state of the terminal device 100 corresponds to the particular data roundabout transmission request state with respect to the first network and transmit the data, which will be transmitted to the terminal device 100 corresponding to the first network, to the terminal device 100 through the particular second network after the generation of the data roundabout transmission request state, so as to start a data roundabout transmission operation.

For example, the management device 400 stops transmitting the data to the terminal device 100 through the first network (for example, WiFi) and transmit the data, which will be transmitted to the terminal device 100 corresponding to the first network (for example, WiFi), to the terminal device 100 through the particular second network (for example, 3G).

As described above, when the data transmitted to the terminal device 100 through the first network is the data to be transmitted, the management device 400 transmits the data to be transmitted to the terminal device 100 through the second network, not the first network.

Meanwhile, as described above, when the data to be transmitted to the terminal device 100 through the first network is the first partial data selected for the first network, the management device 400 transmits the second partial data selected for the second network to the terminal device 100 through the second network and the first partial data selected for the first network to the terminal device 100 also through the second network, not the first network.

Alternatively, in another example, the management device 400 transmits the data, which will be transmitted to the terminal device 100 corresponding to the first network, to the terminal device 100 through the first network and the second network after the generation of the data roundabout transmission request state.

That is, the management device 400 copies the data to the terminal device 100 corresponding to the first network (for example, WiFi) and transmit the same data to the terminal device 100 through the first network (for example, WiFi) and the second network (for example, 3G). That is, while maintaining the data transmission to the terminal device 100 through the first network (for example, WiFi), the management device 400 transmits the same data to the terminal device 100 through the second network (for example, 3G) at the same time.

As described above, when the data transmitted to the terminal device 100 through the first network is the data to be transmitted, the management device 400 transmits the same data to be transmitted to the terminal device 100 through the first network and the second network.

Meanwhile, as described above, when the data to be transmitted to the terminal device 100 through the first network is the first partial data, the management device 400 transmits the first partial data selected for the first network through the first network, the second partial data selected for the second network to the terminal device 100 through the second network, and the first partial data selected for the first network to the terminal device 100 also through the second network.

Meanwhile, the terminal device 100 determines the data roundabout transmission request state, informs the management device 400 of the data roundabout transmission request state, and then determines whether the state escapes from the data roundabout transmission request state.

That is, the terminal device 100 determines whether the state escapes from the data roundabout transmission request state by determining whether the device connection from the first network device 200a to another first network device 200b with respect to the first network normally ends, whether a connection error generated with respect to the first network is resolved, or whether the use of a particular data service type through the first network ends.

The terminal device 100 determines the data roundabout transmission request state and then informs the management device 400 of the data roundabout transmission request state. Then, the terminal device 100 determines whether the state escapes from the data roundabout transmission request state. When the state escapes from the data roundabout transmission request state, the terminal device 100 informs the management device 400 that the state escapes from the data roundabout transmission request state.

When the state of the terminal device 100 escapes from the data roundabout transmission request state with respect to the first network, the management device 400 ends the performed data roundabout transmission operation.

That is, the management device 400 recognizes that the state of the terminal device 100 escapes from the data roundabout transmission request state with respect to the first network through a message informing of the escape from the data roundabout transmission request state.

Further, according to the above described example, the management device 400 stops the operation of transmitting the data corresponding to the first network (for example, WiFi) to the terminal device 100 through the second network (for example, 3G) and reinitiates data transmission to the terminal device 100 through the first network (for example, WiFi) as it was originally.

Alternatively, according to another example described above, the management device 400 stops the operation of copying the data transmitted to the terminal device 100 through the first network (for example, WiFi) and transmitting the data to the terminal device 100 through the second network (for example, 3G). Accordingly, the management device 400 continues to transmit the data to the terminal device 100 through the first network (for example, WiFi) as it was originally.

Figure 2:
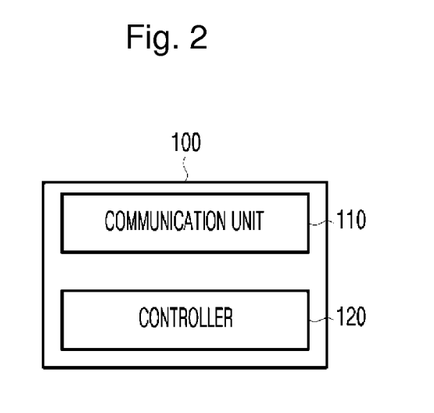
FIG. 2 is a schematic block diagram of a configuration of a data transmission/reception device over multiple networks according to at least one embodiment of the present disclosure.

Hereinafter a detailed configuration of the receiving device according to at least one embodiment of the present disclosure will be described with reference to FIG. 2.

The terminal device 100 acts as the receiving device in the downlink, and includes a communication unit 110 configured to receive data through two or more networks and a controller 120 configured to receive data through a first network among the two or more networks, determine whether a state of the terminal device 100 corresponds to a particular data roundabout transmission request state for receiving the data having been received through the first network through a particular second network, and inform the management device 400 of the particular data roundabout transmission request state when the data corresponds to the particular data roundabout transmission request state as a result of the determination. Other components of the terminal equipment 100, such as the communication unit 110 and the controller 120 are implemented by one or more processors and/or application-specific integrated circuits (ASICs).

The communication unit 110 includes a communication module configured to interwork with the first network devices (200a, 200b . . . ) by using the WiFi network and with the second network device 300 by using the 3G network.

The communication unit 110 is connected with the management device 400 through a network selected for data transmission/reception from the two or more networks, that is, the first network according to the data transmission service based on the multiple networks. Further, the communication unit 110 is connected with the management device 400 through the second network.

Accordingly, the communication unit 110 receives data transmitted from the first network device (for example, first network device 200a) and the second network device 300.

At this time, data received by the communication unit 110 through the first network are the first partial data selected for the first network from the partial data divided from the data to be transmitted based on the preset transmission rates of the respective networks or are the data to be transmitted, which has not been divided.

The controller 120 receives data through the first network among the two or more networks, determines whether the state of the terminal device is in a state indicating the data roundabout transmission request state for receiving the data, which has been received through the first network, through a second network, and informs the management device 400 of the particular data roundabout transmission request state when the state corresponds to the particular data roundabout transmission request state as a result of the determination. The data roundabout transmission request state indicates the state that the first network is not good condition and is changed to the second network to continually and alternatively receive the data.

More specifically, the controller 120 determines whether the state of the terminal device corresponds to the data roundabout transmission request state for receiving the data having been received through the first network through the second network. A detailed description thereof is the same as the above description.

Meanwhile, the controller 120 determines the data roundabout transmission request state, informs the management device 400 of the data roundabout transmission request state, and then determines whether the state escapes from the data roundabout transmission request state.

That is, the controller 120 determines whether the state escapes from the data roundabout transmission request state by determining whether the device connection from the first network device 200a to another first network device 200b with respect to the first network normally ends, whether a connection error generated with respect to the first network is resolved, or whether the use of a particular data service type through the first network ends.

The controller 120 determines the data roundabout transmission request state and then informs the management device 400 of the data roundabout transmission request state. Then, the controller 120 determines whether the state escapes from the data roundabout transmission request state. When the state escapes from the data roundabout transmission request state, the controller 120 informs the management device 400 that the state escapes from the data roundabout transmission request state.

Figure 3:
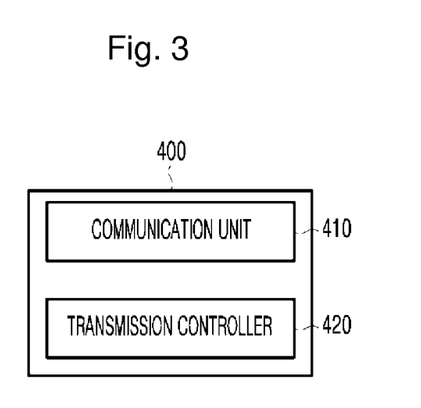
FIG. 3 is a schematic block diagram of a configuration of a data transmission device over multiple networks according to at least one embodiment of the present disclosure.

Hereinafter a detailed configuration of the transmitting device according to at least one embodiment of the present disclosure will be described with reference to FIG. 3.

The management device 400 corresponding to the transmitting device in the downlink includes a communication unit 410 configured to transmit data through two or more networks and a transmission controller 420 configured to transmit data to the terminal device 100 through the first network among the two or more networks and transmit data, which will be transmitted to the terminal device 100 corresponding to the first network, to the terminal device 100 through the second network after the generation of the data roundabout transmission request state. Other components of the management device 400, such as the communication unit 410 and the transmission controller 420 are implemented by one or more processors and/or application-specific integrated circuits (ASICs).

The communication unit 410 includes a communication module configured to interwork with the first network devices (200a, 200b . . . ) by using the WiFi network and with the second network device 300 by using the 3G network.

The transmission device 420 transmits data to the terminal device 100 through the first network among the two or more networks, and transmits data having been transmitted to the terminal device 100 corresponding to the first network to the terminal device 100 through the second network after the generation of the data roundabout transmission request state when the state of the terminal device 100 corresponds to the data roundabout transmission request state.

More specifically, the transmission controller 420 controls the communication unit 410 to transmit the data to the terminal device 100 through the first network among the two or more networks.

At this time, the data transmitted to the terminal device 100 through the first network are the first partial data selected for the first network from the partial data divided from the data to be transmitted based on the preset transmission rates of the respective networks or are the data to be transmitted, which has not been divided.

When the state of the terminal device 100 corresponds to the data roundabout transmission request state with respect to the first network, the transmission controller 420 transmits data, which will be transmitted to the terminal device 100 corresponding to the first network, to the terminal device 100 through the second network after the generation of the data roundabout transmission request state.

At this time, the data roundabout transmission request state includes at least one of a network device connection movement prediction state where a connection between several network devices corresponding to the first network is moved, a connection error generation state where a connection error of the first network is generated, and a data service type use state where the data received through the first network corresponds to a particular data service type.

That is, the transmission controller 420 identifies whether the state of the terminal device 100 corresponds to the particular data roundabout transmission request state with respect to the first network.

For example, the transmission controller 420 identifies whether the state of the terminal device 100 corresponds to the data roundabout transmission request state by receiving the message informing of the data roundabout transmission request state from the terminal device 100 as described above.

Then, the management device 420 recognizes that the state of the terminal device 100 corresponds to the data roundabout transmission request state with respect to the first network and transmit the data, which will be transmitted to the terminal device 100 corresponding to the first network, to the terminal device 100 through the second network after the generation of the data roundabout transmission request state, so as to start a data roundabout transmission operation. The data roundabout transmission operation is the same as described above.

Of course, the transmission controller 420 directly performs by itself, through an interworking with the terminal device 100, the operation of determining whether the state of the terminal device 100 corresponds to the data roundabout transmission request state based on at least one of the signal intensity of the connected network device corresponding to the first network, the wireless quality information measured for the accessed network device and the available bandwidth.

Further, when the state of the terminal device 100 escapes from the data roundabout transmission request state with respect to the first network, the transmission controller ends the performed data roundabout transmission operation. At this time, the data roundabout transmission operation is the same as described above.

Figure 4:
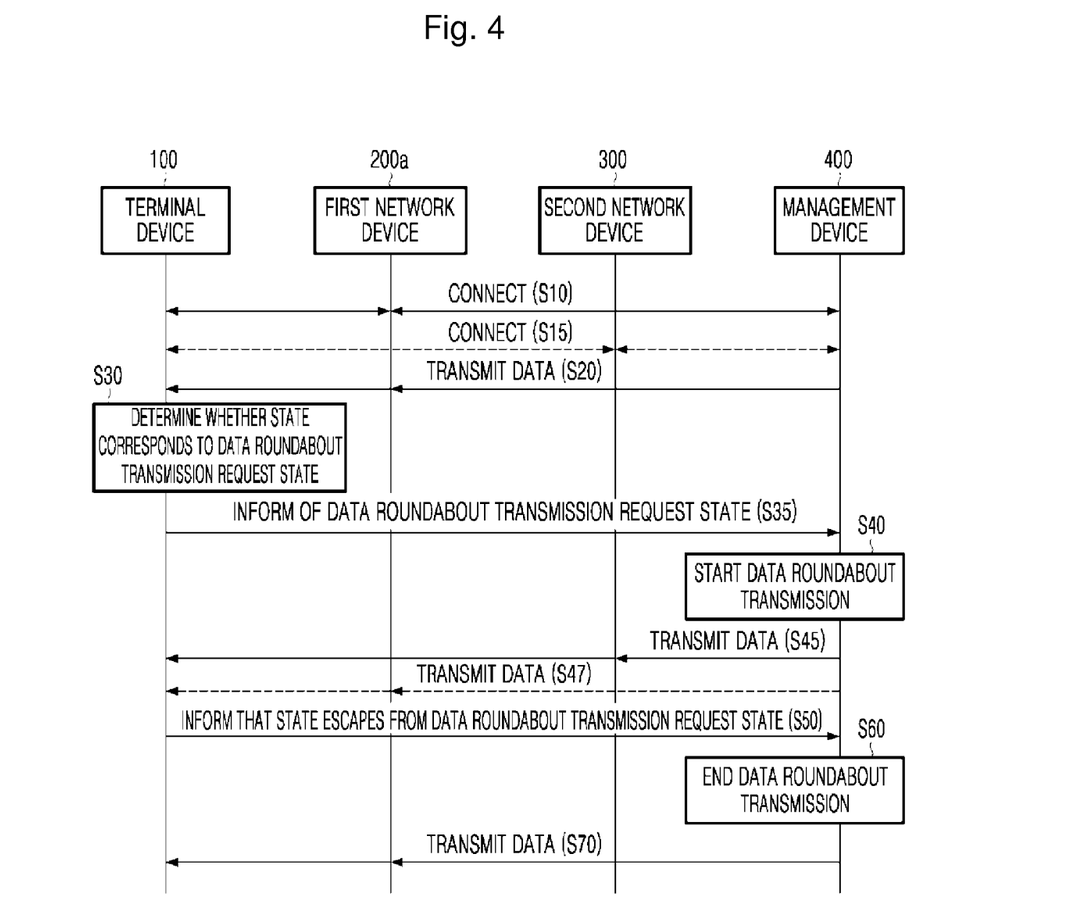
FIG. 4 is a schematic view of a flow of a data transmission service over multiple networks according to at least one embodiment of the present disclosure.
Figure 5:
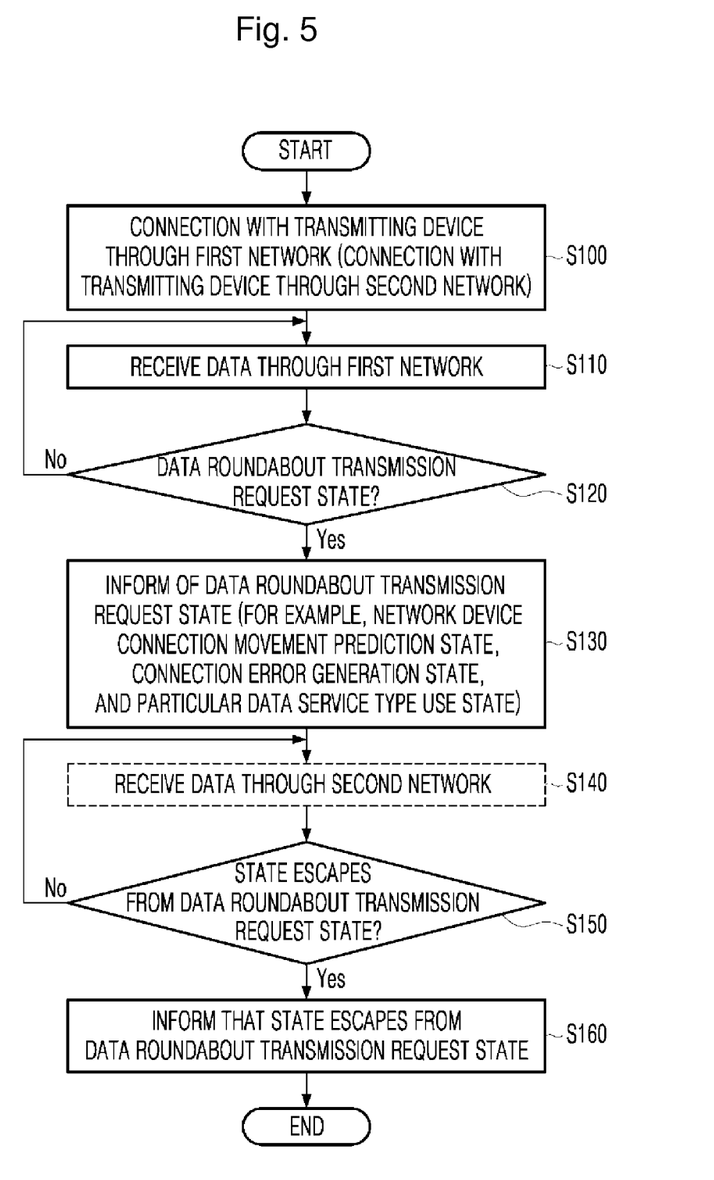
FIG. 5 is a flowchart of a data transmission/reception service over multiple networks according to at least one embodiment of the present disclosure.
Figure 6:
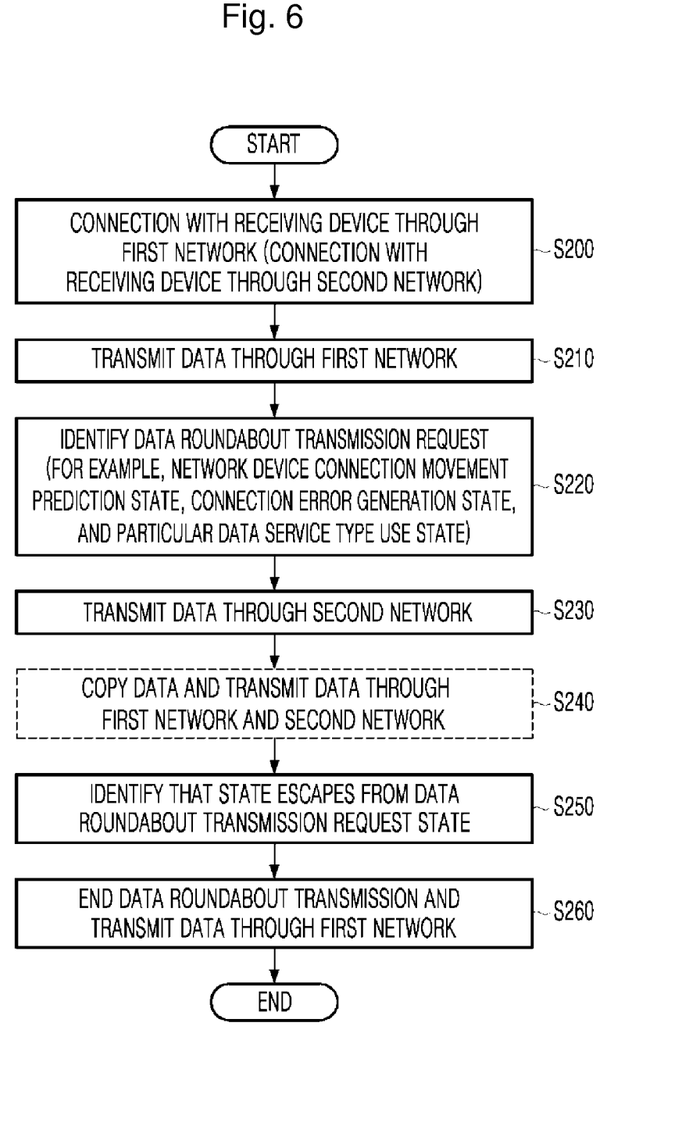
FIG. 6 is a flowchart of a data transmission over multiple networks according to at least one embodiment of the present disclosure.

Hereinafter a data transmission service method over multiple networks according to at least one embodiment of the present disclosure will be described with reference to FIGS. 4 to 6. Here, reference numerals of the configurations illustrated in FIGS. 1 and 3 will be referred to when describing configurations of FIG. 4 for convenience of the description.

First, a service process of the data transmission service method over the multiple networks according to at least one embodiment of the present disclosure will be described with reference to FIG. 4.

The management device 400 and the terminal device 100 are connected to each other through a network selected for data transmission/reception from two or more networks, that is, the first network according to a data transmission service over multiple networks in S10. Further, the management device 400 and the terminal device 100 are connected to each other through the second network in S15.

The management device 400 corresponding to the transmitting side device transmits data to the terminal device 100 corresponding to the receiving device through the first network (for example, WiFi) in S20.

The terminal device 100 corresponding to the receiving side device receives the data transmitted from the management device 400 through the first network.

The terminal device 100 determines whether the terminal device 100 is in a data roundabout transmission request state for receiving the data, which has been received through the first network, through a second network. Here, a method of determining the data roundabout transmission request state is the same as described above.

When the terminal device 100 is determined as being in the data roundabout transmission request state, the terminal device 100 transmits a message informing the transmitting device that transmits the data, that is, the management device 400 of the data roundabout transmission request state in S35.

When a state of the receiving device, that is, the terminal device 100 corresponds to the data roundabout transmission request state with respect to the first network, the management device 400 transmits data, which will be transmitted to the terminal device 100 corresponding to the first network, to the terminal device 100 through the second network after the generation of the data roundabout transmission request state in S40 and S45.

For example, the management device 400 receives a message informing that the terminal device 100 is in the data roundabout transmission request state from the terminal device 100 as described above.

In this event, the management device 400 recognizes that the state of the terminal device 100 corresponds to the data roundabout transmission request state with respect to the first network through the message informing of the data roundabout transmission request state and transmit the data, which will be transmitted to the terminal device 100 corresponding to the first network, to the terminal device 100 through the second network after the generation of the data roundabout transmission request state, so as to start the data roundabout transmission operation in S40. For example, the management device 400 stops transmitting the data to the terminal device 100 through the first network (for example, WiFi) and transmit the data, which will be transmitted to the terminal device 100 corresponding to the first network (for example, WiFi), to the terminal device 100 through the second network (for example, 3G) in S45.

Alternatively, the management device 400 copies the data to the terminal device 100 through the first network (for example, WiFi) and transmit the same data to the terminal device 100 through the first network (for example, WiFi) and the second network (for example, 3G). That is, while maintaining the data transmission to the terminal device 100 through the first network (for example, WiFi) in S47, the management device 400 transmits the same data to the terminal device 100 through the second network (for example, 3G) at the same time in S47. Various methods of the roundabout transmission are the same as described above.

Thereafter, the terminal device 100 determines the data roundabout transmission request state and then informs the management device 400 of the data roundabout transmission request state. Then, the terminal device 100 determines whether the terminal device 100 escapes from the data roundabout transmission request state. When the terminal device 100 escapes from the data roundabout transmission request state, the terminal device 100 informs the management device 400 that the state escapes from the data roundabout transmission request state in S50.

When the state of the terminal device 100 escapes from the data roundabout transmission request state with respect to the first network, the management device 400 ends the performed data roundabout transmission operation in S60.

That is, the management device 400 recognizes that the state of the terminal device 100 escapes from the data roundabout transmission request state with respect to the first network through the message informing of the escape from the data roundabout transmission request state.

Further, according to the above described example, the management device 400 stops the operation of transmitting the data corresponding to the first network (for example, WiFi) to the terminal device 100 through the second network (for example, 3G) and reinitiates data transmission to the terminal device 100 through the first network (for example, WiFi) as original in S70.

Alternatively, according to another example described above, the management device 400 stops the operation of copying the data transmitted to the terminal device 100 through the first network (for example, WiFi) and transmitting the data to the terminal device 100 through the second network (for example, 3G). Accordingly, the management device 400 continues to transmit the data to the terminal device 100 through the first network (for example, WiFi) as original in S70.

Hereinafter an operation method of the receiving device according to at least one embodiment of the present disclosure will be described with reference to FIG. 5.

The terminal device 100 corresponding to the receiving device in the downlink is connected with the management device 400 through a network selected for data transmission/reception from two or more networks, that is, the first network according to the data transmission service over the multiple networks in S100. Further, in the operation method of the receiving side device according to at least one embodiment of the present disclosure, the terminal device 100 is connected with the management device 400 through the second network.

Thereafter, the terminal device 100 receives data transmitted from the first network device (for example, first network device 200*a*) and the second network device 300, for example, first partial data and second partial data in S110.

Next, the terminal device 100 receives data through the first network among the two or more networks and determines whether the state of the terminal device 100 corresponds to the data roundabout transmission request state for receiving the data having been received through the first network through a second network in S120, and informs the management device 400 of the data roundabout transmission request state when the state corresponds to the data roundabout transmission request state as a result of the determination. A method of determining the data roundabout transmission request state is the same as described above.

Thereafter, when the terminal device 100 is determined as being in the data roundabout transmission request state, the terminal device 100 informs the management device 400 of the data roundabout transmission request state.

Next, the terminal device 100 receives the data, which is to be received through the first network, through the second network after the generation of the data roundabout transmission request state in S140.

Meanwhile, the terminal device 100 determines the data roundabout transmission request state, informs the management device 400 of the data roundabout transmission request state, and then determines whether the state escapes from the data roundabout transmission request state in S150.

That is, the terminal device 100 determines whether the state escapes from the data roundabout transmission request state by determining whether the device connection from the first network device 200*a* to another first network device 200*b* with respect to the first network normally ends, whether a connection error generated with respect to the first network is resolved, or whether the use of a particular data service type through the first network ends.

The terminal device 100 determines the data roundabout transmission request state and then informs the management device 400 of the data roundabout transmission request state. Then, the terminal device 100 determines whether the state escapes from the data roundabout transmission request state. When the state escapes from the data roundabout transmission request state, the terminal device 100 informs the management device 400 that the state escapes from the data roundabout transmission request state in S160.

The terminal device 100 receives the data corresponding to the first network through the second network and then through the first network again.

Hereinafter an operation method of the transmitting device according to at least one embodiment of the present disclosure will be described with reference to FIG. 6.

The management device 400 corresponding to the transmitting device in the downlink is connected with the terminal device 100 through a network selected for data transmission/reception from two or more networks, that is, the first network according to the data transmission service over the multiple networks in S200. Further, in the operation method of the transmitting side device according to at least one embodiment of the present disclosure, the management device 400 is connected with the terminal device 100 through the second network.

When the management device 400 transmits the data to the terminal device 100 through the first network among the two or more networks and the state of the terminal device 100 corresponds to the data roundabout transmission request state with respect to the first network, the management device 400 transmits the data, which will be transmitted to the terminal device 100 through the first network, to the terminal device 100 through the second network.

The management device 400 transmits the data to the terminal device 100 through the first network among the two or more networks in S210.

Further, when the state of the terminal device 100 corresponds to the data roundabout transmission request state with respect to the first network, the management device 400 transmits the data, which will be transmitted to the terminal device 100 corresponding to the first network, to the terminal device 100 through the second network after the generation of the data roundabout transmission request state. The data roundabout transmission request state is the same as described above.

In other words, the management device 400 identifies whether the state of the terminal device 100 corresponds to the data roundabout transmission request state with respect to the first network in S220.

For example, the management device 400 identifies whether the state of the terminal device 100 corresponds to the data roundabout transmission request state by receiving the message informing of the data roundabout transmission request state from the terminal device 100 as described above.

The management device 400 recognizes that the state of the terminal device 100 corresponds to the data roundabout transmission request state with respect to the first network through the message informing of the data roundabout transmission request state and transmit the data, which will be transmitted to the terminal device 100 corresponding to the first network, to the terminal device 100 through the second network after the generation of the data roundabout transmission request state, so as to start the data roundabout transmission operation.

The management device 400 stops transmitting the data to the terminal device 100 through the first network (for example, WiFi) and transmit the data, which will be transmitted to the terminal device 100 corresponding to the first network (for example, WiFi), to the terminal device 100 through the second network (for example, 3G) in S230.

Alternatively, in another example, the management device 400 transmits the data, which will be transmitted to the terminal device 100 corresponding to the first network, to the terminal device 100 through the first network and the second network in S240.

Further, when the state of the terminal device 100 escapes from the data roundabout transmission request state with respect to the first network, the management device 400 ends the performed data roundabout transmission operation.

That is, the management device 400 recognizes that the state of the terminal device 100 escapes from the data roundabout transmission request state with respect to the first network through the message informing of the escape from the data roundabout transmission request state in S250.

Further, according to the above described example, the management device 400 stops the operation of transmitting the data corresponding to the first network (for example, WiFi) to the terminal device 100 through the second network (for example, 3G) and reinitiates data transmission to the terminal device 100 through the first network (for example, WiFi) as original in S260.

According to various embodiments of the present disclosure, when data is transmitted to a terminal device through a network which does not provide a handover function in a multi-network environment where data are transmitted/received through multiple networks, if guaranteeing data transmission continuity is difficult, the data is transmitted in a roundabout way through another network. Accordingly, the seamless data transmission service is performed and thus an effect such as the handover function is created. As a result, reliability and quality of the service is improved.

Meanwhile, the various embodiments of the present disclosure are implemented in the form of program commands that is executed through various computer means and recorded in a non-transitory computer-readable recording medium. The non-transitory computer-readable recording medium includes a program command, a data file, a data structure and the like solely or in a combined manner. The program command recorded in the medium is a program command specially designed and configured for the present disclosure or a program command known to be used by those skilled in the art of the computer software. The non-transitory computer-readable recording medium includes, for example, magnetic media, such as a hard disk, a floppy disk and a magnetic tape, optical media, such as a CD-ROM and a DVD, magneto-optical media, such as a floptical disk, and hardware devices specially configured to store and execute program commands, such as a ROM, a RAM, a flash memory and the like. The program command includes, for example, high-level language codes that are executed by a computer using an interpreter or the like, as well as a machine code generated by a compiler. The hardware devices are configured to operate using one or more software modules in order to perform the operation of the present disclosure, and vice versa. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

Although exemplary embodiments of the present disclosure have been described for illustrative purposes, those skilled in the art will appreciate that various modifications, additions and substitutions are possible, without departing from the characteristics of the disclosure. That is, it is understood that the present disclosure should not be limited to these embodiments but various changes and modifications are made by one ordinarily skilled in the art within the subject matter, the spirit and scope of the present disclosure as hereinafter claimed. Specific terms used in this disclosure and drawings are used for illustrative purposes and not to be considered as limitations of the present disclosure. While the present disclose has been shown and described with reference to various embodiments thereof, it will be understood by those skilled in the art that various changes in form and details may be made therein without departing from the spirit and scope of the claimed invention as defined by the appended claims.

The invention claimed is:

1. A transmitting device, comprising:
 a communication unit configured to
  transmit data through two or more networks including a first network and a second network,
  receive a message indicating a data roundabout transmission request state of a receiving device with respect to the first network from the receiving device, and
 a transmission controller configured to
  control the communication unit to
   transmit the data to the receiving device through the first network, and
   transmit the data, which is to be transmitted to the receiving device through the first network, to the receiving device in a roundabout way through the second network in response to the message, and
  end transmitting the data in the roundabout way through the second network to transmit the data through the first network when the state of the receiving device is determined to escape from the roundabout transmission request state with respect to the first network,
 wherein the transmission controller is configured to identify, from the message, whether the receiving device is in the data roundabout transmission request state, based on at least one selected from the group consisting of an available bandwidth, a connection error generation state, a predetermined delay value of receiving the data with respect to the first network,
 the transmission controller is configured to identify that the receiving device is in the data roundabout transmission request state when the data transmitted to the receiving device through the first network indicate a particular data service type, wherein the particular data service type includes at least one selected from the group consisting of: a service type of traffic capacity larger than a predetermined threshold; bidirectional communication traffic,traffic requiring security; a predetermined traffic for information collection; and a predetermined control signal.

2. The transmitting device of claim 1, wherein the transmission controller is configured to further identify, from the message, whether the receiving device is in the data roundabout transmission request state, based on at least one selected from the group consisting of (i) a signal intensity with respect to the first network, (ii) wireless quality information measured for the first network.

3. The transmitting device of claim 1, wherein the transmission controller is further configured to identify that the receiving device is in the data roundabout transmission request state when connection continuity of the second network is higher than that of the first network.

4. The transmitting device of claim 1, wherein the transmission controller is configured to transmit the data, which is to be transmitted to the receiving device through the first network only, to the receiving device through both the first network and the second network in response to the message indicating the data roundabout transmission request state of the receiving device with respect to the first network.

5. A receiving device, comprising:
 a communication unit configured to receive data through two or more networks including a first network and a second network; and
 a controller configured to
  control the communication unit to receive data from a transmitting device through the first network,
  determine whether the receiving device is in a data roundabout transmission request state for receiving the data, which is to be received through the first network, in a roundabout way through the second network, and
  control the communication unit to transmit a message informing the transmitting device of the data roundabout transmission request state when the receiving device is determined as being in the data roundabout transmission request state,
 wherein the controller is configured to determine that the receiving device is in the data roundabout transmission request state when the receiving device, connecting to the first network to provide no handover function, transmits the message to the transmitting device as the receiving device moves from an area of the first network,
 wherein the controller is configured to determine, from the message, whether the receiving device is in the data roundabout transmission request state, based on at least one selected from the group consisting of an available bandwidth, a connection error generation state, a predetermined delay value of receiving the data with respect to the first network, or
 the controller is configured to determine that the receiving device is in the data roundabout transmission request state when the data transmitted to the receiving device through the first network indicate a particular data service type, and
 wherein the particular data service type includes at least one selected from the group consisting of: a service type of traffic capacity larger than a predetermined threshold; bidirectional communication traffic,traffic requiring security; a predetermined traffic for information collection; and a predetermined control signal.

6. The receiving device of claim 5, wherein the controller is configured to determine whether the receiving device is in the data roundabout transmission request state, based on at least one selected from the group consisting of (i) a signal intensity with respect to the first network, (ii) wireless quality information measured for the first network.

7. The receiving device of claim 5, wherein the controller is configured to determine that the receiving device is in the data roundabout transmission request state when connection continuity of the second network is higher than that of the first network.

8. An operation method of a transmitting device, the operation method comprising:
 transmitting data to a receiving device through a first network among two or more networks;
 receiving a message from the receiving device;
 identifying whether the message indicates a data roundabout transmission request state of the receiving device with respect to the first network;
 transmitting the data, which is to be transmitted to the receiving device through the first network, to the receiving device in a roundabout way through a second network among the two or more networks when the receiving device is determined as being in the data roundabout transmission request state as a result of the identification; and ending the transmission of the data in the roundabout way through the second network to transmit the data through the first network when the state of the receiving device is determined to escape from the roundabout transmission request state with respect to the first network, wherein the identifying comprising identifying, from the message, whether the receiving device is in the data roundabout transmission request state, based on at least one selected from the group consisting of an available bandwidth, a connection error generation state, a predetermined delay value of receiving the data with respect to the first network, identifying that the receiving device is in the data roundabout transmission request state when the data transmitted to the receiving device through the first network indicate a particular data service type, wherein the particular data service type includes at least one selected from the group consisting of: a service type of traffic capacity larger than a predetermined threshold; bidirectional communication traffic,traffic requiring security; a predetermined traffic for information collection; and a predetermined control signal.

9. The operation method of claim 8, wherein the identifying further comprises:

identifying, from the message, whether the receiving device is in the data roundabout transmission request state, based on at least one selected from the group consisting of (i) a signal intensity with respect to the first network, (ii) wireless quality information measured for the first network.

10. The operation method of claim 8, wherein the identifying comprises:

identifying that the receiving device is in the data roundabout transmission request state when connection continuity of the second network is higher than that of the first network.

11. The operation method of claim 8, further comprising:

transmitting the data, which is to be transmitted to the receiving device through the first network only, to the receiving device through both the first network and the second network when the receiving device is determined as being in the data roundabout transmission request state with respect to the first network.

12. The operation method of claim 8, further comprising:

copying the data to be transmitted to the receiving device through the first network only; and transmitting the copied data to the receiving device through both the first network and the second network.

13. The operation method of claim 8, further comprising:

identifying that the state of the receiving device escapes from the data roundabout transmission request state with respect to the first network based on a message received from the receiving device, the message informing of the escape from the data roundabout transmission request state; and transmitting the data to the receiving device through the first network when the receiving device with respect to the first network is identified as escaping being in the data roundabout transmission request.

14. An operation method of a receiving device, the operation method comprising:

receiving data from a transmitting device through a first network among two or more networks;

determining whether the receiving device is in a data roundabout transmission request state for receiving the data, which is to be received through the first network, in a roundabout way through a second network among two or more networks; and transmitting a message informing the transmitting device of the data roundabout transmission request state when the receiving device is determined as being in the data roundabout transmission request state as a result of the determination, wherein the determining comprises:

determining that the receiving device is in the data roundabout transmission request state when the receiving device, connecting to the first network to provide no handover function, transmits the message to the transmitting device as the receiving device moves from an area of the first network, determining, from the message, whether the receiving device is in the data roundabout transmission request state, based on at least one selected from the group consisting of an available bandwidth, a connection error generation state, a predetermined delay value of receiving the data with respect to the first network, or determining that the receiving device is in the data roundabout transmission request state when the data transmitted to the receiving device through the first network indicate a particular data service type, and wherein the particular data service type includes at least one selected from the group consisting of: a service type of traffic capacity larger than a predetermined threshold; bidirectional communication traffic,traffic requiring security; a predetermined traffic for information collection; and a predetermined control signal.

15. The operation method of claim 14, wherein the determining comprises:

determining whether the receiving device is in the data roundabout transmission request state, based on at least one selected from the group consisting of (i) a signal intensity with respect to the first network, (ii) wireless quality information measured for the first network.

16. The operation method of claim 14, wherein the determining comprises:

determining that the receiving device is in the data roundabout transmission request state when connection continuity of the second network is higher than that of the first network.

17. The operation method of claim 14, wherein the data roundabout transmission request state includes at least one selected the group consist of a network device connection movement prediction state indicating a connection between the first network and the second network is moved, a connection error generation state indicating a connection error of the first network is generated, and a data service type use state indicating the data received through the first network corresponds to a particular data service type.

18. The operation method of claim 14, further comprising:

determining whether the receiving device escapes from the data roundabout transmission request state with respect to the first network; and informing the transmitting device that the receiving device escapes from the data roundabout transmission request state with respect to the first network when the receiving device is determined as escaping from the data roundabout transmission request state as a result of the determination.

\* \* \* \* \*